Oct. 28, 1952 J. Q. UMBERGER 2,615,807
STRIPPING FILM AND METHOD OF STRIPPING
Filed Feb. 11, 1949
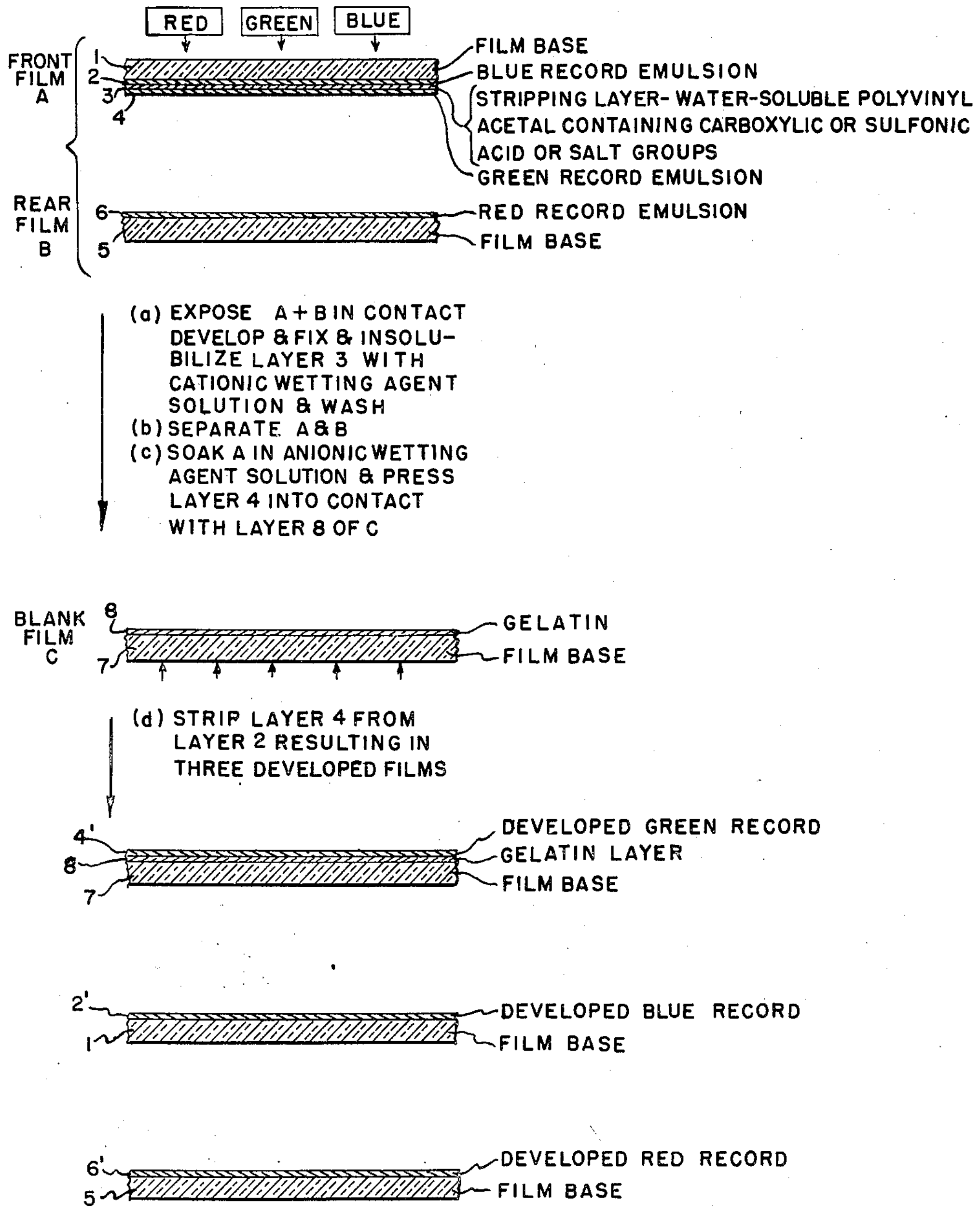
INVENTOR
JACOB QUENTIN UMBERGER
BY Lynn Barratt Morris
ATTORNEY Patented Oct. 28, 1952 2,615,807

UNITED STATES PATENT OFFICE 2,615,807

STRIPPING FILM AND METHOD OF STRIPPING

Jacob Quentin Umberger, Holmdel, N. J., assignor to E. I. du Pont de Nemours & Company, Wilmington, Del., a corporation of Delaware Application February 11, 1949, Serial No. 75,977

5 Claims. (Cl. 95—2)

This invention relates to photography and more particularly to a process for insolubilizing stripping layers in photographic films. Still more particularly, it relates to a process for transferring an image-bearing layer from a stripping film to another support which involves insolubilization and resolubilization of the stripping layer.

Photographic stripping films are described in Jennings U. S. Patent 2,462,503. The stripping films of that application constitute the front film (A) of a bipack. The stripping layer which is disposed between two gelatino silver halide emulsion layers is composed essentially of a water-soluble macromolecular acetal of a hydroxyl polymer containing a plurality of recurring intralinear $$-CH_2-\overset{|}{C}HOH$$

or vinyl alcohol units. These acetals are water-soluble by virtue of the fact that the hydrocarbon nucleus which is linked to the hydroxyl polymer nucleus through an acetal linkage has a hydrogen atom substituted by a group taken from the class consisting of COOZ and $SO_3Z$ groups wherein Z is a hydrogen atom or a water-soluble cation, e. g., alkali metal, ammonium or an amine salt group.

The stripping films just described are used in conjunction with the rear film (B) of a bipack which consists of a transparent film base carrying a light-sensitive gelatino silver halide emulsion layer. This layer is generally sensitive to green or red light. In using the bipack film, the respective emulsion surfaces of the front film (A) and the rear film (B) are placed in contact and disposed in a camera so that the front film is first exposed through the base. The two films are then developed whereby three-color separation records are formed in the respective light-sensitive emulson layers of the bipack element. The color separation records of the front film (A) in one practical use are developed, fixed and washed, and rolled into contact with the gelatin layer of a gelatin-blank film. The outer image-bearing layer of the front film being adherent to the gelatin-blank film is then stripped from the lower image-bearing layer. The gelatin-blank film should, of course, be placed in registration contact with the emulsion layer to be transferred. Color prints made from (1) the separated, developed records of the front film and (2) the rear film can then be superimposed in register on a transparent support whereby a positive multicolor picture is formed or the separation records can be used for printing purposes.

The stripping films of the aforementioned application while being useful in large scale continuous cine film processing have a minor disadvantage in that the stripping layers tend to dissolve or loosen during the washing step after development and fixation. Hence, the stripping action should be carried out immediately after the photographic processing has been completed. This sometimes is disadvantageous since it is often desirable to strip continuous links of motion picture film at a rate different from that at which the film passes through the continuous developing and fixing machine. Furthermore, it is sometimes inconvenient to conduct a stripping operation in the same area as the continuous developing machine.

An object of this invention is to provide a method for insolubilizing the water-soluble stripping layer of a stripping film. Another object is to provide a method for insolubilizing such a layer and later resolubilizing it so that stripping can be accomplished. A further object is to provide a simple and economical method for delaying the stripping action of a water-soluble polyvinyl acetal stripping layer. Still other objects will be apparent from the following description of the invention.

It has been discovered that stripping layers of the aforedescribed type can be insolubilized and thereby rendered quite difficult to strip by treating the polyvinyl acetals with an aqueous solution containing a water-soluble cationic surface-active wetting agent containing an aliphatic hydrocarbon radical of 8 to 20 carbon atoms. This treatment can be effected prior to formation of the layer but in the preferred form of the invention is effected after the photographic stripping element is made and exposed and before or after development or fixation but prior to any extended washing in water.

The cationic surface-active wetting agents apparently enter into a metathetical or double decomposition reaction with the polyvinyl acetals whereby the cation of the solubilizing carboxylic or sulfonic acid or salt group of such acetal is replaced by the cation of the cationic surface-active wetting agent and the resulting salt is markedly less water-soluble than that of the original polyvinyl acetal.

It has been further discovered that the polyvinyl acetal stripping layers which have been insolubilized by the foregoing treatment can be modified so that they become quite water-sensitive or water-soluble by treating the film element containing the insolubilized polyvinyl acetal layer in an aqueous solution containing an anionic surface-active wetting agent having a pH of about 1.0 to 4.5. The layer so modified can then be readily stripped from the remaining strata and support.

In the drawing there is shown the front film of a bipack consisting of base 1, blue record emulsion 2, stripping layer 3 composed of the aforedescribed polyvinyl acetal and green record emulsion 4, the rear film consisting of base 5 and red record emulsion 6, and a gelatin blank film consisting of base 7 and gelatin layer 8 and a process of exposing, developing, fixing, insolubilizing the stripping layer, resolubilizing said layer and transferring the outer emulsion layer of the front film to the blank film by a stripping operation. In addition, there is shown the resulting three developed green, blue and red records 4′, 2′ and 6′ on their respective bases 7, 1 and 5.

It will be apparent from the above that an important aspect of the invention resides in a three-step process of processing a stripping photographic element, one step being that of insolubilizing the polyvinyl acetal layer and the others of resolubilizing the layer and stripping it and any layers superimposed thereon from the remaining layer or layers and support.

In the preferred aspect of the invention, a stripping film having two light-sensitive silver halide gelatin emulsion layers separated by a cold water-soluble stripping layer predominating in a sodium o-sulfobenzaldehyde acetal of a hydroxyl polymer containing a plurality of recurring $$-CH_2-\overset{|}{C}HOH$$

groups as polymer-forming units is insolubilized by treatment with an aqueous solution containing a cationic surface-active wetting agent and resolubilized just before it is desired to effect stripping by treatment with an aqueous solution of a sodium salt of an alkyl sulfate of 8 to 20 carbon atoms or a mixture of such salts.

The invention will be further illustrated by but is not intended to be limited to the following examples:

*Example I*

A cellulose nitrate film base having a thin gelatin coating was coated to a weight of 52 mg. AgBr per sq. dec. with a gelatino-silver iodobromide emulsion which had admixed therewith 50% by weight, based on the silver salt, of yellow colloidal silver. A mixture of 100 parts of 100% hydrolyzed polyvinyl acetate (medium viscosity-molecular weight 15,000 to 20,000), 1,080 parts ethylene glycol, 73 parts of sodium-o-sulfobenzaldehyde monohydrate, and 9 parts 100% phosphoric acid is stirred at 80° C. for one hour and then precipitated with 10,000 parts acetone and dried to give 142 parts of a white solid. A solution containing 50 grams of this acetal per 1,000 grams of a 10% ethanol, 90% water solution was digested 45 minutes at 125° F., cooled to 90° F., neutralized to pH 7 and coated to form a layer 0.0001 to 0.0003 inch thick. A gelatino-silver iodobromide emulsion containing 1,1′-diethyl-2,2′-cyanine iodide as an ortho-sensitizing dye was coated on the acetal layer to a weight of 48 mg. AgBr per sq. dec. This film element constitutes the front film (A) of a bipack. It may be slit and perforated to form a motion picture film.

A similar film base was coated with thin gelatin substratum and dried. A gelatino-silver iodobromide emulsion containing as a green blind sensitizing dye 1,1′-diethyl-2,4-carbocyanine iodide was coated on the gelatin substratum. It constitutes the rear film of a bipack and may be slit and perforated in like manner to form a motion picture film.

The two films were placed with the gelatin layers in contact and exposed to a color scene and film (A) was processed as follows:

(1) Developed 15 minutes at 68° F. in a developer mixed as follows:

| | | |
|---|---|---|
| Water (125° F. or 52° C.) | cc | 500.0 |
| N-p-methylaminophenol sulfate | g | 2.5 |
| Sodium sulfite, desiccated | g | 75.0 |
| Hydroquinone | g | 3.0 |
| Borax, granular | g | 5.0 |

Add cold water to make 0.1 liter.

(2) Fixed five minutes at 68° F. in a fixer mixed as follows:

| | | |
|---|---|---|
| Water (125° F. or 52° C.) | cc | 750.0 |
| Sodium thiosulfate (Hypo) | g | 240.0 |
| Potassium metabisulfite | g | 24.0 |

Add cold water to make 1.0 liter.

(3) Hardened 10 minutes at 68° F. in a hardening bath mixed as follows:

| | | |
|---|---|---|
| Water (125° F. or 52° C.) | cc | 750.0 |
| Sodium Sulfate, desiccated | g | 50.0 |
| Trimethyl dodecyl ammonium bromide | g | 10.0 |

Water added to make 1.0 liter.

(4) Washed five minutes in cold running water.

(5) Dried quickly in warm air dryer.

The above processed film appeared perfectly normal in all respects except that the contrast appeared high due to the presence of two image layers. Without the above hardening treatment, the stripping layer is quite cold water-soluble and dissolves in the wash water.

The outer image bearing layer of element (A) can be transferred to a separate perforated motion picture blank film, for example, one consisting of a transparent film base coated with a thin gelatin layer. This light-insensitive film will be hereinafter referred to as a gel-blank. The gelatin layer is preferably coated from a 4 to 10% aqueous gelatin solution containing saponin and a small amount, for example, 10 to 25 cc. of 80% lactic acid per liter. The transfer can be effected in the following manner: The dried element (A) is soaked in a transfer bath of the following composition:

| | Grams |
|---|---|
| Sodium tetralin sulfonate | 50 |
| Sodium dodecyl sulfate | 50 |
| Citric acid | 5 |
| Sodium phosphate ($NaH_2PO_4.1H_2O$) | 5 |

Water added to make 1 liter.

Phosphoric acid (85%) added to adjust the pH to 2.0±0.1.

*Example II*

A photographic stripping film was made by coating a cellulose acetate film base with a layer as follows: 100 parts of 100% hydrolyzed polyvinyl acetate (medium viscosity-molecular weight 15,000 to 20,000), 1,080 parts ethylene glycol, 73 parts of sodium-o-sulfobenzaldehyde monohydrate, and 9 parts 100% phosphoric acid is stirred at 80° C. for one hour and then precipitated with 10,000 parts acetone and dried to give 142 parts of a white solid. A solution containing 50 grams of this acetal per 1,000 grams of a 10% ethanol, 90% water solution was digested 45 minutes at 125° F., cooled to 90° F., neutralized to pH 7 and coated to form a layer 0.0001 to 0.0003 inch thick. A gelatino-silver iodobromide emulsion containing 1,1'-diethyl-2,2'-cyanine iodide as an ortho-sensitizing dye was coated on the acetal layer to a weight of 48 mg. AgBr per sq. dec.

The film just described was cut into narrow strips about 1 inch in width and 6 inches in length. These strips were then immersed halfway in the following solutions at 68° F.:

| | | | |
|---|---|---|---|
| (1) | Sodium sulfate, desiccated | g | 5.0 |
| | Boric acid | g | 2.0 |
| | Water added to make 100.0 cc. | | |
| (2) | Sodium sulfate, desiccated | g | 5.0 |
| | Boric acid | g | 2.0 |
| | Tetraethyl ammonium bromide | g | 5.0 |
| | Water added to make 100.0 cc. | | |

(3) Same as (2) but replacing the tetraethyl ammonium bromide by 5.0 grams trimethyl dodecyl ammonium bromide.

These strips were then soaked for 10 minutes at 68° F. with agitation in the following solutions:

| | | | |
|---|---|---|---|
| (1) | Boric acid | g | 2.0 |
| | Water added to make 100.0 cc. | | |
| (2) | Boric acid | g | 2.0 |
| | Sodium dodecyl sulfate | g | 5.0 |
| | Water added to make 100.0 cc. | | |

(3) Same as (2) but substituting 5 grams of a mixture of the sodium salts of sulfonated alkane hydrocarbons of 12 to 18 carbon atoms containing small amounts of chlorine attached to carbon atoms predominating in those of 15 and 16 carbon atoms obtained by the process described in U. S. Patents 2,228,598 and 2,337,552, for the sodium dodecyl sulfate.

(4) Same as (2) but substituting 5 grams of the dioctyl ester of sodium sulfosuccinic acid for the sodium dodecyl sulfate.

(5) Same as (2) but substituting 5 grams of sodium tetralin sulfonate for the sodium dodecyl sulfate.

(4) Same as (3) but substituting 5.0 grams trimethyl octadecyl ammonium bromide.

(5) Same as (3) but substituting 5.0 grams trimethyl cetyl ammonium bromide.

(6) Same as (3) but substituting 5.0 grams dimethyl ethyl cetyl ammonium bromide.

(7) Same as (3) but substituting 5.0 grams cetyl pyridinium bromide.

Strips 1 to 7 were now completely immersed and soaked in water (with agitation) at 68° F. for ten minutes.

Strips 1 to 7 were now dried.

On close scrutiny it was found that for strips 1 and 2 the stripping layer had completely dissolved and washed off.

For strips 3 to 7, however, the stripping layer dissolved only in that area which was not dipped into the insolubilizing baths 3 to 7, inclusive.

*Example III*

Nine strips of film similar to that of Example II were immersed halfway into insolubilizing solution (3) of Example II for five minutes at 68° F.

(6) Same as (2) but substituting 5 grams of a mixture of sulfonated alkane hydrocarbons predominating in those of 12 and 13 carbon atoms and containing small amount of chlorine attached to carbon. Such compounds can be made in the manners described in U. S. Patents 2,228,598 and 2,337,552.

(7) The transfer bath of Example II.

| | | | |
|---|---|---|---|
| (8) | Boric acid | g | 2.0 |
| | Sodium sulfate, desiccated | g | 5.0 |
| | Water to make 100.0 cc. | | |

These eight strips were then washed for two minutes in water and dried.

Upon close scrutiny it was observed that for strips 1 and 8 the stripping polymer dissolved only in that area which had not been dipped into insolubilizing bath 3.

On the other hand, however, it was observed that for strips 2 to 7 inclusive, the stripping polymer was dissolved in all areas including that insolubilized by treatment with insolubilizing bath 3.

In place of the specific cationic surface-active wetting agents described above, there may be substituted various other specific agents of this type which contain an aliphatic hydrocarbon radical of 8 to 20 carbon atoms. Among such agents are dodecyl pyridinium chloride, cetyl pyridinium chloride, octyl-, decyl-, dodecyl-, and octadecyl-dimethyl benzyl ammonium chloride; cetyl dimethyl benzyl ammonium chloride, myristamidopropyl dimethyl benzyl ammonium chloride and corresponding quaternary phosphonium salts as well as the corresponding ternary sulfonium salts, e. g., dimethylhexadecylsulfonium bromide.

Mixtures of two or more of such agents can be used if desired. In addition, various water-soluble inorganic polyvalent metal hardening agents which yield metal ions having a valence of 3 to 4 can be used in addition to or in place of part of the cationic surface-active wetting agents. Suitable salts for this include the salts of aluminum, chromium, iron, thorium, zirconium, titanium, cerium and vanadium, e. g., the chlorides, bromides, acetates, sulfates and mixed salts such as potassium aluminum sulfate, iron ammonium sulfate. These salts can be used in an amount from 1 to 30 grams per liter of solution.

Similarly, in place of the anionic wetting agents described in the above examples, for resolubilizing there may be substituted a large number of other specific wetting agents of this type. Suitable agents include the sodium, potassium, and ammonium salts of decyl, dodecyl, tetradecyl, hexadecyl, octadecyl and oleyl sulfate; the triethanolamine, triethylamine, cyclohexylamine, piperidine, and tetraethylammonium salts of such sulfates. Mixtures of any two or more of such salts can be used. A good commercial mixture is composed of the sodium salts obtained by sulfating the mixture of alcohols obtained by the hydrogenation of coconut oil. Sodium potassium and ammonium isopropyl naphthalene sulfonates are also useful.

The sodium dodecyl sulfate used in the foregoing examples was electrolyte free but contained minor amounts of other sodium n-alkyl sulfates of 10 to 18 carbon atoms being made by sulfating a fraction of the higher alcohols obtained from coconut oil as described above.

The pH of the transfer solutions can readily be regulated by the addition of buffering agents. In addition, to those of the examples, there may be used potassium acid phthalate, potassium acid tartrate, sodium citrate, sodium tartrate and sodium lactate.

In place of the specific film elements described in Example I, there may be substituted various other film elements having similar polyvinyl acetal sulfonic acid or carboxylic acid compound stripping layers. Among such acetals are those described in German Patent 643,650 and U. S. Patent 2,310,943. The free acids of such acetals can be converted into water-soluble salt groups by a simple neutralization. To be more specific, they can be neutralized or made slightly basic (pH 7–9) by salt formation with alkali metals, ammonia, or amines which form water-soluble salts, e. g., mono-, di-, and tri-methylamine, mono-, di-, and tri-ethylamine, piperidine, cyclohexylamine, ethylene-diamine-1,2, hexamethylenediamine-1,6, piperazine, morpholine, etc. Neutral or slightly basic (pH 8–9) solutions or dispersions are advantageous because of their freedom from effect on the emulsions and their ability to neutralize any acidic materials that may be released by the support through decomposition. Moreover, they are more stable than the acidic solutions or dispersions.

Partially and completely hydrolyzed polyvinyl alcohols of low, intermediate, and high viscosity having a molecular weight of 5,000 to 50,000 and hydrolyzed interpolymers of vinyl esters with one or less equivalent of a terminally unsaturated interpolymerizable organic compound can be used in preparing the hydrophilic vinyl alcohol acetals of aldehydes containing carboxylic or sulfonic acid groups. In general, such polymers having for each 100 carbon atoms between 20 and 50 free non-phenolic hydroxyl groups are useful.

The preferred hydrophilic macromolecular acetals of vinyl alcohol polymers used in the films treated in accordance with this invention are prepared by acetalization from (1) polyvinyl alcohol of high molecular weight (viscosity of 4% aqueous solution at 20° C., 40 to 60 centipoises), (2) polyvinyl alcohol of medium molecular weight (viscosity of 4% aqueous solution at 20° C., 15 to 30 centipoises) substituted on 0 to 30% of the hydroxyl groups with ester groups, e. g., acetate, propionate groups, acetal groups, e. g., formal, acetal, propional, butyral, and benzal groups, and (3) 75–100% hydrolyzed interpolymers of vinyl acetate with 0.05 to 0.5 mol equivalents of terminally unsaturated mono-olefins, e. g., ethylene, such as described in United States Patent 2,386,347, and (4) completely hydrolyzed interpolymers of vinyl acetate with minor proportions (less than 50%) of polymerizable vinyl or vinylidene compounds, for example, vinyl chloride, vinyl cyanide, alkyl methacrylates, e, g., methyl and ethyl methacrylate, etc., with an aldehyde containing free carboxylic or sulfonic acid groups or water-soluble salts of such groups.

The degree of substitution of the acetal groups may vary over a considerable range. Thus, vinyl alcohol polymers having between 10 and 50% of the hydroxyl groups acetalized with the aforedescribed aldehydes have been found useful. However, it has been found that the best results are obtained when between 10 and 35% of the hydroxyl groups are acetalized with the aldehydes. The total acetal content based on these figures will vary depending on the hydroxyl content of the polymer, but it has been found that the best results are obtained when between 5 and 17% of the carbon atoms of the polymer chain contain the acetal groups with a —COO— or —$SO_3$— radical. The acetals having this degree of substitution may be used in the form of the free acids but are preferably used in the form of the water-soluble salts which are soluble to the extent of at least 5% at temperatures below 30° C. in methanol or ethanol containing up to 50% of water.

The stripping layers need not be wholly composed of the water-soluble polyvinyl acetals described above which contain a solubilizing COOZ or $SO_3Z$ group. However, such polymers constitute the essential and predominant part of the stripping layers. There may be mixed with such acetals water-soluble or hydrophilic hydroxyl polymers, e. g., polyvinyl alcohol of low, medium, or high viscosity, or partially hydrolyzed vinyl esters, polyvinyl acetate and polyvinyl chloracetate, polyvinyl acetals of formaldehyde, ethylaldehyde, benzaldehyde, etc., wherein there is sufficient free hydroxyl groups to confer water-soluble or hydrophilic properties.

Thus, in place of the specific polymeric acetals of the vinyl alcohol of the example, there may be substituted similar acetals of other aldehydes containing carboxylic and/or sulfonic acid groups. Suitable additional aldehydes include aliphatic sulfoaldehydes of the formula $$HSO_3(CH_2)_nCHO$$

where $n$ is 2 to 10, e. g., beta-sulfo-propionaldehyde, aliphatic carboxyaldehydes of the formula $HOOC(CH_2)_nCHO$, where $n$ is 2 to 10, e. g., beta-formylpropionic acid; benzaldehyde-parasulfonic acid, terephthalaldehydic acid, p-(beta-formylethyl)-benzoic acid and o-carboxymethoxybenzaldehyde.

The present invention has the advantage that it provides a novel and practical method of temporarily insolubilizing a water-soluble stripping layer. This temporary insolubilization is of importance in commercial photographic processing laboratories in that it permits one to carry out the stripping operation in a different room from that in which the chemical photographic processing, e. g., developing and fixing, is carried out. This means that the equipment used in the stripping operation will be free from the corrosive and toxic conditions which are present in developing rooms.

A further advantage of the invention is that it gives the technician more latitude in the stripping operation. The stripping speed can be controlled at the will of the technician. Hence, if a certain area of a film needs a special treatment this can be readily accomplished since the stripping rate can be varied without interfering with the development operation. Moreover, the stripping operation can be carried out under well-illuminated conditions thus permitting the operator to carefully follow the stripping of each frame.

An additional advantage in the invention is that complete processing of the front film can be accomplished while retaining adherence between the image-bearing records. A master positive print of the two superposed records can be made before removing the outer record. Hence, this record can be reformed from the master positive print in the event of damage or loss of the outer layer during transferring it to another base, and stripping. A further advantage is that the stripping operations can be carried out at a central laboratory while production companies on location can process and view each day's exposures and edit them before stripping.

As many widely different embodiments of this invention can be made without departing from the spirit and scope thereof, it is to be understood that the invention is not to be limited except as defined by the claims.

What is claimed is:

1. A process for modifying the solubility characteristics of the stripping layer of a photographic element, said layer consisting of a water-soluble macromolecular acetal of a hydroxy polymer having a plurality of recurring intralinear $$-CH_2-\overset{|}{C}HOH-$$

groups as polymer-forming units with an aldehyde containing a solubilizing group taken from the class consisting of —COOZ and —$SO_3Z$, where Z is a member taken from the group consisting of hydrogen and a cation which forms water-soluble salts, which aldehyde has hydrogen atoms only attached to the remaining carbon atoms, said acetal layer being disposed between two light-sensitive gelatin silver halide emulsion layers, one of which is anchored to a film support, which involves exposing, developing and fixing steps and prior to extensive washing, reducing the solubility of said acetal by treating said acetal layer with an aqueous solution containing a water-soluble cationic surface-active wetting agent containing a hydrocarbon radical of 8 to 20 carbon atoms washing the element, increasing the solubility of the resulting acetal layer by treating it with an aqueous solution containing an anionic surface-active wetting agent having a pH of 1 to 6, and stripping the outer emulsion layer from the other emulsion layer.

2. The process which comprises developing an exposed photographic film element having superimposed thereon two latent image-bearing gelatino-silver halide emulsions which are separated by a stripping layer consisting essentially of a water-soluble macromolecular acetal of a hydroxy polymer having a plurality of recurring intralinear $$-CH_2-\overset{|}{C}HOH$$

groups as polymer-forming units with an aldehyde containing a solubilizing group taken from the class consisting of —COOZ and —$SO_3Z$, where Z is a member taken from the group consisting of hydrogen and a cation which forms water-soluble salts, which aldehyde has hydrogen atoms only attached to the remaining carbon atoms, fixing said element, treating said element in an aqueous solution containing a cationic surface-active wetting agent containing an aliphatic hydrocarbon radical of 8 to 18 carbon atoms, washing the resulting element and drying the same, subsequently resolubilizing said layer by treating it in an aqueous bath having a pH of 1 to 6, containing an anionic surface-active wetting agent, pressing the outer image bearing layer of said element into contact with a blank film bearing a gelatin layer and stripping the image-bearing layer adhering to the gelatin layer from the remainder of the exposed photographic film.

3. The process as set forth in claim 2 wherein said cationic surface-active wetting agent is trimethyl dodecyl ammonium bromide and said anionic wetting agent is sodium dodecyl sulfate.

4. A photographic element comprising a film base having superimposed on one surface two light-sensitive silver halide emulsion layers which are separated by a stripping layer consisting essentially of an insoluble macromolecular acetal of a hydroxyl polymer having a plurality of recurring intralinear $$-CH_2-\overset{|}{C}HOH$$

groups as polymer-forming units and a plurality of intralinear groups of the formula:

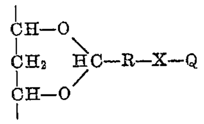

where R is a divalent hydrocarbon radical, X is a member taken from the group consisting of —COO— and —$SO_3$— and Q is a radical corresponding to the cation in a cationic surface-active wetting agent containing an aliphatic hydrocarbon radical of 8 to 20 carbon atoms.

5. A photographic element as set forth in claim 4 wherein said hydroxyl polymer is polyvinyl alcohol.

JACOB QUENTIN UMBERGER.

REFERENCES CITED

The following references are of record in the file of this patent:

UNITED STATES PATENTS

| Number | Name | Date |
|---|---|---|
| 2,197,994 | Butement | Apr. 23, 1940 |
| 2,462,503 | Jennings | Feb. 22, 1949 |

FOREIGN PATENTS

| Number | Country | Date |
|---|---|---|
| 611,828 | Great Britain | Nov. 4, 1948 |

OTHER REFERENCES

Young & Coons, "Surface Active Agents," Chemical Publishing Co., 1945, page 109.